(12) United States Patent
Kittleson et al.

(10) Patent No.: US 10,022,921 B2
(45) Date of Patent: Jul. 17, 2018

(54) TURBINE COMPONENT PATCH DELIVERY SYSTEMS AND METHODS

(71) Applicant: General Electric Company, Schenectady, NY (US)

(72) Inventors: Jacob John Kittleson, Greenville, SC (US); Don Mark Lipkin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 261 days.

(21) Appl. No.: 14/568,458

(22) Filed: Dec. 12, 2014

(65) Prior Publication Data

US 2015/0174838 A1 Jun. 25, 2015

Related U.S. Application Data

(63) Continuation-in-part of application No. 14/134,257, filed on Dec. 19, 2013.

(51) Int. Cl.
*B29C 73/02* (2006.01)
*B23P 6/04* (2006.01)
(Continued)

(52) U.S. Cl.
CPC ............ *B29C 73/025* (2013.01); *F01D 5/005* (2013.01); *B23P 6/002* (2013.01); *B23P 6/04* (2013.01);
(Continued)

(58) Field of Classification Search
CPC ... B29C 73/025; F01D 5/005; F05D 2230/90; F05D 2230/80; F05D 2300/15;
(Continued)

(56) References Cited

U.S. PATENT DOCUMENTS 3,995,157 A 11/1976 Holub et al.
4,649,858 A 3/1987 Sakai et al.
(Continued)

FOREIGN PATENT DOCUMENTS

EP 1832668 A1 9/2007
EP 2287133 A2 2/2011
(Continued)

OTHER PUBLICATIONS

EP Search Report dated Apr. 22, 2015 for corresponding EP application 14198237.1 to related U.S. Appl. No. 14/134,257.
(Continued)

*Primary Examiner* — Alison L Hindenlang
*Assistant Examiner* — Jerzi H Moreno Hernandez
(74) *Attorney, Agent, or Firm* — Charlotte C. Wilson; Ernest G. Cusick; Frank A. Landgraff

(57) ABSTRACT

A turbine component patch delivery system can include a compressed gas source fluidly connected to a delivery line comprising a dispensing end. The turbine component patch delivery system can further include one or more turbine component patch carriers that can be projected out of the dispensing end of the delivery line by the compressed gas source, wherein each of the one or more turbine component patch carriers comprise a turbine component patch material housed within a breakaway shell.

8 Claims, 4 Drawing Sheets

(51) Int. Cl.
*F01D 5/00* (2006.01)
*B29K 103/04* (2006.01)
*B29L 31/08* (2006.01)
*B23P 6/00* (2006.01)

(52) U.S. Cl.
CPC .......... *B23P 6/045* (2013.01); *B29K 2103/04* (2013.01); *B29L 2031/08* (2013.01); *F05D 2300/15* (2013.01); *Y10T 29/49318* (2015.01)

(58) Field of Classification Search
CPC ........... B23P 6/045; B23P 6/002; B23P 6/007; Y10T 29/49318; B29K 2103/04; B29L 2031/08
See application file for complete search history.

(56) References Cited

U.S. PATENT DOCUMENTS

| | | |
|---|---|---|
| 5,268,338 A | 12/1993 | Gerberick |
| 5,383,442 A * | 1/1995 | Tippmann ............... F41A 29/02 124/73 |
| 5,928,448 A | 7/1999 | Daws |
| 6,296,941 B1 | 10/2001 | Eaton, Jr. et al. |
| 6,312,763 B1 | 11/2001 | Eaton, Jr. et al. |
| 6,410,148 B1 | 6/2002 | Eaton, Jr. et al. |
| 6,532,946 B1 * | 3/2003 | Paquette ................. F41B 11/52 124/49 |
| 6,759,151 B1 | 7/2004 | Lee |
| 7,115,327 B2 | 10/2006 | Spitsberg et al. |
| 7,323,247 B2 | 1/2008 | Raybould et al. |
| 7,509,735 B2 | 3/2009 | Philip et al. |
| 7,595,114 B2 | 9/2009 | Meschter et al. |
| 7,687,099 B2 * | 3/2010 | Jarvis .................. B05B 12/004 118/323 |
| 7,758,910 B2 | 7/2010 | Moreau et al. |
| 8,124,252 B2 | 2/2012 | Cybulsky et al. |
| 8,168,259 B2 | 5/2012 | Sarrafi-Nour et al. |
| 8,221,825 B2 | 7/2012 | Reitz et al. |
| 8,470,460 B2 | 6/2013 | Lee |
| 8,563,080 B2 | 10/2013 | Hopkins |
| 8,597,724 B2 | 12/2013 | Bunting et al. |
| 2002/0020402 A1 * | 2/2002 | Kotsiopoulos .......... F41B 11/57 124/76 |
| 2002/0125349 A1 * | 9/2002 | Michael .................. B05B 5/032 239/691 |
| 2005/0235493 A1 * | 10/2005 | Philip ...................... C23C 4/02 29/889.1 |
| 2006/0042083 A1 * | 3/2006 | Baker ................ B23K 26/0096 29/889.1 |
| 2006/0110609 A1 * | 5/2006 | Eaton .................... C04B 41/009 428/446 |
| 2007/0039602 A1 * | 2/2007 | Caspi ..................... F41A 23/34 124/74 |
| 2007/0171406 A1 * | 7/2007 | Stokes ................... F01D 9/065 356/241.1 |
| 2007/0199226 A1 * | 8/2007 | Handel ..................... F41G 1/40 42/118 |
| 2007/0202269 A1 | 8/2007 | Potter et al. |
| 2008/0152815 A1 * | 6/2008 | Stephenson ........... C09D 5/086 427/385.5 |
| 2008/0182017 A1 * | 7/2008 | Singh .................... B22F 3/1055 427/142 |
| 2009/0110803 A1 * | 4/2009 | Mather .................. B05B 5/032 427/8 |
| 2009/0162674 A1 | 6/2009 | Boutwell et al. |
| 2009/0241357 A1 * | 10/2009 | Raschella ............ G01C 15/004 33/228 |
| 2010/0081009 A1 * | 4/2010 | Nelson ..................... C23C 4/18 428/701 |
| 2010/0129673 A1 * | 5/2010 | Lee .......................... C09D 1/00 428/450 |
| 2011/0027576 A1 | 2/2011 | Kool et al. |
| 2011/0203281 A1 | 8/2011 | Sarrafi-Nour et al. |
| 2011/0244138 A1 * | 10/2011 | Schlichting ............. C23C 4/06 427/448 |
| 2015/0267058 A1 * | 9/2015 | Lee .......................... C09D 1/00 428/335 |

FOREIGN PATENT DOCUMENTS

| | | | |
|---|---|---|---|
| EP | 2503027 A1 | 9/2012 | |
| WO | WO 2012027442 A1 * | 3/2012 | ........... C04B 41/009 |

OTHER PUBLICATIONS

U.S. Non-Final Office Action issued in connection with Related U.S. Appl. No. 14/568,443 dated Oct. 13, 2015.
U.S. Final Office Action issued in connection with Related U.S. Appl. No. 14/568,443 dated Apr. 25, 2016.
U.S. Non-Final Office Action issued in connection with Related U.S. Appl. No. 14/568,443 dated Sep. 8, 2016.
U.S. Non-Final Office Action issued in connection with Related U.S. Appl. No. 14/134,257 dated Sep. 22, 2016.
U.S. Final Office Action issued in connection with Related U.S. Appl. No. 14/568,443 dated Feb. 1, 2017.
U.S. Final Office Action issued in connection with Related U.S. Appl. No. 14/134,257 dated Feb. 22, 2017.
U.S. Non Final Office Action issued in connection with Related U.S. Appl. No. 14/568,443 dated Apr. 4, 2017.
U.S. Final Office Action issued in connection with Related U.S. Appl. No. 14/568,443 dated Sep. 22, 2017.

* cited by examiner

TURBINE COMPONENT PATCH DELIVERY SYSTEMS AND METHODS

CROSS REFERENCE TO RELATED APPLICATIONS

This application is a continuation-in-part to U.S. patent application Ser. No. 14/134,257, filed on Dec. 19, 2013, which is fully incorporated by reference and made a part hereof.

STATEMENT REGARDING FEDERALLY SPONSORED RESEARCH & DEVELOPMENT

This invention was partially made with government support under government contract No. DE-FC26-05NT42643 awarded by the Department of Energy. The government has certain rights to this invention.

BACKGROUND OF THE INVENTION

The subject matter disclosed herein relates to patch repair and, more specifically, environmentally resistant patches for filling voids in silicon-containing components, such as silicon carbide (SiC) based ceramic matrix composites (CMCs).

Environmental barrier coatings (EBCs) protect gas turbine components fabricated from silicon-containing substrates from exposure to potentially harmful chemical environments in service. Examples of silicon-containing substrates include SiC based CMCs, SiC or silicon nitride ($Si_3N_4$) based monolithic ceramics, and metal silicides, such as Mo—Si—B and Nb—Si based composites. Examples of EBCs include alkaline earth aluminosilicates (e.g., barium-strontium aluminosilicate, or BSAS), rare earth (RE) monosilicates having the general composition $RE_2SiO_5$ and RE disilicates having the general composition $RE_2Si_2O_7$. The RE elements can include La, Ce, Pr, Nd, Sm, Eu, Gd, Tb, Dy, Ho, Er, Tm, Yb, and/or Lu, and the rare earth-like elements Y and/or Sc. EBCs are generally selected to have a good match in their coefficient of thermal expansion (CTE) to that of the silicon-containing substrate material.

Some EBC materials are deposited on components using a plasma spraying process. The plasma spraying process provides flexibility to deposit a large variety of materials within a wide coating thickness range (ranging from about 0.001 inch to about 0.080 inch) without major process modifications.

Furthermore, if an EBC experiences a localized spall or a pinhole defect, the underlying CMC may be subject to cavitation resulting from water vapor induced volatilization and subsequent surface recession during service. If allowed to grow unmitigated, such cavities may reduce the load-bearing capability of the component, disrupt airflow, or even progress to through-thickness holes that lead to ingestion of combustion gases or leakage of high-pressure cooling air, thus adversely affecting operating efficiency and durability of the machine. Furthermore, depending on the type and application of the turbine component, surfaces may similarly require modification via turbine component patch materials for a variety of other reasons.

Accordingly, materials and methods for modifying surfaces such as by filling surface-connected voids in turbine components would be welcome in the art.

BRIEF DESCRIPTION OF THE INVENTION

In one embodiment, a turbine component patch delivery system is disclosed. The turbine component patch delivery system includes a compressed gas source fluidly connected to a delivery line comprising a dispensing end. The turbine component patch delivery system further includes one or more turbine component patch carriers that can be projected out of the dispensing end of the delivery line by the compressed gas source, wherein each of the one or more turbine component patch carriers comprise a turbine component patch material housed within a breakaway shell.

In another embodiment, a turbine component patch delivery method is disclosed. The turbine component patch delivery method includes providing a compressed gas source fluidly connected to a delivery line comprising a dispensing end and positioning a turbine component patch carrier in the delivery line, wherein the turbine component patch carrier comprises a turbine component patch material housed within a breakaway shell. The turbine component patch delivery method further includes projecting the turbine component patch carrier through the delivery line and out the dispensing end towards a surface of a turbine component using the compressed gas source, wherein the breakaway shell breaks open to at least partially coat the surface of the turbine component with the turbine component patch material.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

Figure 1:
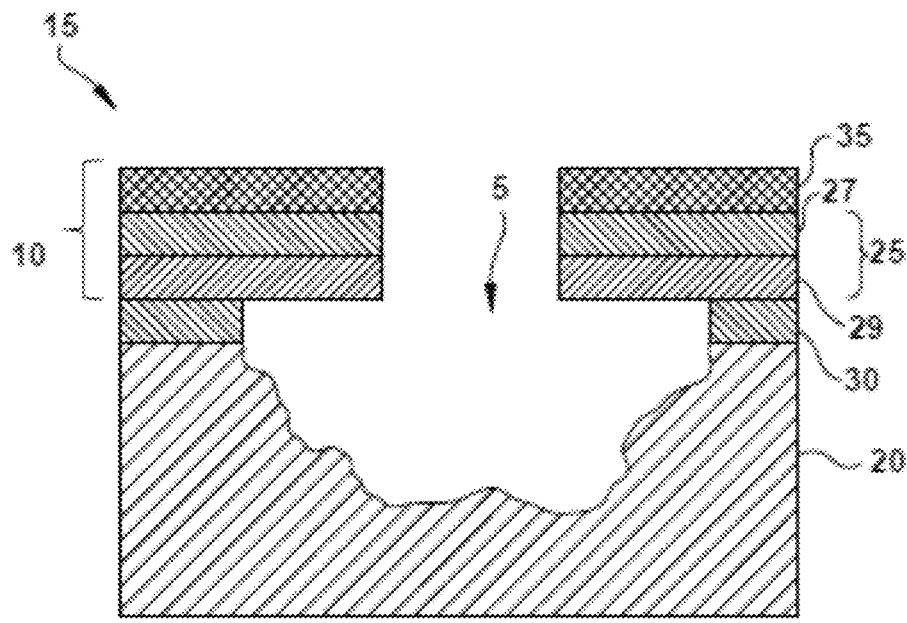
FIG. 1 is a partial sectional side view of a component coated with an environmental barrier coating according to one or more embodiments shown or described herein.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure provide environmentally resistant (e.g., stable and/or protective) patches for repair of silicon-containing materials, including, for example, a SiC-based CMC substrate. Further, the present disclosure provides a delivery system for delivering the environmentally resistant patch to a cavity in the silicon-containing material so as to affect a repair without disassembly of the system. In some embodiments, the silicon-containing material is a CMC component in a turbine engine and the repair is accomplished in situ (i.e., without disassembly of the case but when the turbine is not running).

Embodiments of the present disclosure are described below in reference to its application in connection with a component for a gas turbine engine fabricated substantially from a silicon-containing material, such as a SiC-based CMC, SiC, $Si_3N_4$, and/or a metal silicide. However, it should be appreciated by those skilled in the art and guided by the teachings herein provided that the disclosure is likewise applicable to any suitable component that is fabricated from a silicon-containing material. Further, such components are incorporated into systems including, without limitations, turbine engines, wherein the components are subjected to extreme thermal and/or chemical conditions during system operation. Such components may be subjected to combustion environments for durations in excess of 20,000 hours at material surface temperatures that can exceed 2200° F.

In one embodiment, various components of the gas turbine engine are formed of a silicon-containing ceramic or CMC material. In a particular embodiment, the CMC material is a SiC/SiC CMC material. The SiC/SiC CMC material includes a silicon carbide containing matrix reinforced with coated silicon carbide fibers. In one embodiment, the ceramic material is a monolithic ceramic material, such as SiC or $Si_3N_4$. In one embodiment, various components of the gas turbine engine are formed of a Mo—Si—B or Nb—Si based metal silicide material.

Referring now to FIG. 1, in one embodiment, an environmental barrier coating 10 is applied to a silicon-based material, such as a turbine engine component 15 fabricated from a CMC substrate material 20. It is apparent to those skilled in the art and guided by the teachings herein provided that turbine engine component 15 can be fabricated from any suitable silicon-based material.

Environmental barrier coating 10 can include a variety of embodiments as appreciated to those skilled in the art. For example, as illustrated in FIG. 1, the environmental barrier coating 10 can comprise at least one intermediate layer 25 bonded to or deposited on CMC substrate material 20. As used herein, references to the term "bonded" are to be understood to include direct and indirect bonding through another layer, such as an optional bondcoat 30. In one embodiment, bondcoat 30 comprises elemental silicon. In one embodiment, intermediate layer 25 has a total thickness of about 0.025 mm to about 1 mm. Intermediate layer 25 can have a coefficient of thermal expansion that is well matched to the coefficient of thermal expansion of substrate material 20. As used herein, references to the term "matched," in reference to a coefficient of thermal expansion, are to be understood to refer to a difference in coefficients of thermal expansion within about $2 \times 10^{-6}/°$ C. In a particular embodiment, bondcoat 30 has a coefficient of thermal expansion matched to substrate material 20.

In one embodiment, intermediate layer 25 includes at least one intermediate layer 29 substantially formed from a rare earth (RE) monosilicate or disilicate. Said RE monosilicates can have the general composition $RE_2SiO_5$ and RE disilicates can have the general composition $RE_2Si_2O_7$. The RE can comprise La, Ce, Pr, Nd, Sm, Eu, Gd, Tb, Dy, Ho, Er, Tm, Yb, and/or Lu, and/or the rare earth-like elements Y and/or Sc. For example, a first intermediate layer 29 can include $(Y,Yb)_2Si_2O_7$. Additionally, intermediate layer 25 can include a second or outer intermediate layer 27 positioned between first intermediate layer 29 and an external barrier layer, such as a recession resistant surface layer 35, as shown in FIG. 1. Intermediate layer 27 can comprise, for example, an alkaline-earth aluminosilicate, such as $(Ba,Sr)Si_2Al_2O_8$ (BSAS). Although only two intermediate layers 27, 29 are shown in FIG. 1, it is apparent to those skilled in the art and guided by the teachings herein provided that intermediate layer 25 can include any suitable number of layers. In one embodiment, the at least one intermediate layer 25 has a combined thickness of about 0.025 mm to about 1 mm.

A recession resistant surface layer 35 can further be applied to or deposited on intermediate layer 25. Recession resistant surface layer 35 is chemically compatible with the underlying intermediate layer 25 and has a high recession resistance in a water vapor containing environment, such as a combustion environment of a turbine engine. In one embodiment, recession resistant surface layer 35 is substantially formed from a rare earth (RE) monosilicate, where RE comprises Y, Sc, Dy, Ho, Er, Tm, Tb, Yb and/or Lu, the monosilicate having a general composition of $RE_2SiO_5$. For example, recession resistant surface layer 35 includes $Y_2SiO_5$ and is applied to intermediate layer 25.

Recession resistant surface layer 35 and any intermediate layers 25 can be applied using any suitable process known to those skilled in the art and guided by the teachings herein provided including, but not limited to, sol-gel chemistry, plasma spray, combustion thermal spray, electrophoretic deposition, slurry dip, slurry spray and/or slurry painting processes. Optional bondcoat 30 can also be deposited by thermal spray, chemical vapor deposition, slurry processing or any other suitable method.

In one embodiment, recession resistant surface layer 35 is applied uniformly to outer intermediate layer 27. In this embodiment, recession resistant surface layer 35 has a thickness of about 0.01 mm to about 0.05 mm. Recession resistant surface layer 35 has a suitable thickness to prevent or resist excessive cracking or peeling in service and to ameliorate penetration by water vapor.

Figure 2:
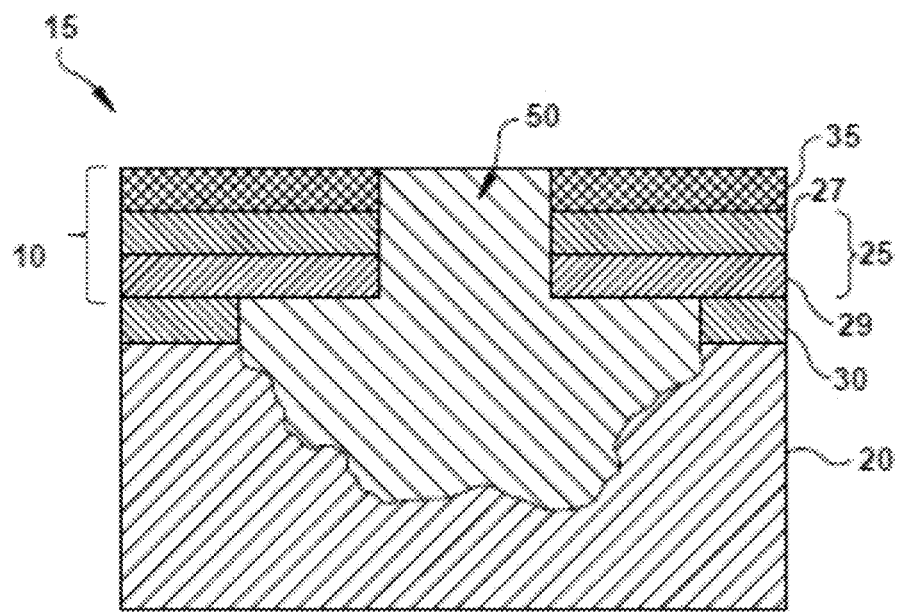
FIG. 2 is a component partially coated with an environmental barrier coating and containing an environmentally resistant patch according to one or more embodiments shown or described herein.

Referring to FIG. 2, an environmentally resistant patch 50 can be used to fill a void 5 in the environmental barrier coating 10 and optionally extending into the bondcoat 30 and CMC substrate material 20. For example, in some embodiments, a void 5 may be present due to a pinhole defect, a spall or a crack in the environmental barrier coating 10 that can subsequently lead to recession-induced material loss in the underlying bondcoat 30 and/or CMC substrate material 20.

The environmentally resistant patch 50 comprises the appropriate characteristics to adhere to the adjacent material, have a CTE close to the adjacent materials, be sufficiently viscous to remain in the target area prior to curing, and have a packing density sufficiently high to survive densification on curing and subsequent operation—all while possessing a chemical composition that protects the turbine engine component 15 from environmental degradation, such as by water vapor induced recession. For example, the environmental barrier coating patch 50 can generally comprise one or more rare earth silicates to achieve the necessary functional properties suitable for patching.

For example, the environmentally resistant patch 50 can have an adhesive strength that allows it to remain in contact with the adjacent environmental barrier coating 10 and/or CMC substrate material 20 once it is disposed in the void 5 of the turbine engine component 15 and cured. This can include an adhesive strength of at least about 3 MPa.

The environmentally resistant patch 50 can further possess a coefficient of thermal expansion that is suitably within the range of the CTE of the substrate material 20. Having a suitable coefficient of thermal expansion will allow the environmental barrier coating patch 50 to avoid imparting or encountering excessive forces from any thermal expansion of the turbine engine component 15 such as may occur during operation. For example, the environmental barrier coating 10 may have a coefficient of thermal expansion of from about $3.5 \times 10^{-6}/°$ C. to about $7.5 \times 10^{-6}/°$ C., or from about $4 \times 10^{-6}/°$ C. to about $6 \times 10^{-6}/°$ C., or about $4.5 \times 10^{-6}/°$ C. to about $5.5 \times 10^{-6}/°$ C.

The environmentally resistant patch 50 can further be formulated to possess a desirable particle size distribution of its solid constituents. For example, the environmentally resistant patch 50 can comprise a mixture of coarse (from about 10 μm to about 100 μm in size), medium (from about 1 μm to about 10 μm in size), and/or fine (from about 10 nm to about 1 μm in size) particles. Depending on the chemical formulation necessary to achieve the suitable adhesion, CTE and any other sought properties, the particle sizes can be distributed to attain a sufficient particle packing that minimizes curing or sintering shrinkage. For example, in some embodiments, the environmentally resistant patch 50 comprises, prior to curing, on an inorganic solids volume basis, from about 40 percent to about 75 percent coarse sized particles, from about 10 percent to about 35 percent medium sized particles, and from about 1 percent to about 30 percent fine sized particles. In some embodiments, the environmentally resistant patch 50 can be, on an inorganic solids volume basis, from about 60 percent to about 70 percent coarse sized particles, from about 20 percent to about 30 percent medium sized particles, and from about 5 percent to about 15 percent fine sized particles. In some particular embodiments, the environmentally resistant patch 50 can be, on an inorganic solids volume basis, about 65 percent coarse sized particles, about 25 percent medium sized particles, and about 10 percent fine sized particles. In some particular embodiments, the environmentally resistant patch 50 can be, on an inorganic solids volume basis, about 50 percent coarse sized particles, about 24 percent medium sized particles, and about 26 percent fine sized particles. These particle size distributions can allow for sufficient strength during operation while still providing acceptable shrinkage during sintering.

The environmentally resistant patch 50 can further be formulated to possess an uncured viscosity suitable to being injected or otherwise disposed within the void 5 and at least temporarily remain there without dripping or running until it is cured. For example, in some embodiments, as will be presented later herein, the environmentally resistant patch 50 may be injected into the void 5 via a deposition tool 120, as part of a patch delivery system 100, which acts similarly to a syringe. In such embodiments, the environmentally resistant patch 50 may thereby possess a viscosity that allows it to flow from a reservoir 121 of the deposition tool 120 under pressure but remain in void 5 until curing. For example, the environmentally resistant patch 50 may have a viscosity of from about 1 Pa·s to about 2,000 Pa·s before curing, or from about 10 Pa·s to about 150 Pa·s before curing.

The environmentally resistant patch 50 may also comprise interconnected porosity resulting in a non-hermetic patch. This may allow for any potential gas or vapor to escape the void after the environmentally resistant patch 50 is applied and cured, such as during operation in a high-temperature oxidizing environment.

As discussed above, the environmentally resistant patch 50 can be chemically formulated to achieve the necessary properties to protect the turbine engine component 15 while still allowing for its disposition and application. For example, the environmental barrier coating patch 50 can be formulated to substantially approach the general $RE_2SiO_5$ and/or $RE_2Si_2O_7$ formulation of the environmental barrier coating 10 as its final chemistry, while still achieving one or all of the above presented properties.

In some embodiments, the environmentally resistant patch 50 can be RE silicate based using compositions near the monosilicate or disilicate line compound. For example, the environmentally resistant patch 50 may comprise—on an inorganic molar basis—from about 80 mole percent to about 100 mole percent of a rare earth monosilicate and/or a rare earth disilicate composition once cured. On an inorganic molar basis, the composition of the environmentally resistant patch 50 may comprise from about 0 mole percent to about 20 mole percent of an inorganic additive such as iron oxide, and/or aluminum oxide, and/or silica and/or a glass. As used herein, the term "cured" refers to the composition of the environmentally resistant patch after a heating (such as the state of the environmentally resistant patch after is disposed in a void and then heated). As also used herein, the term "uncured" refers to the composition of the environmentally resistant patch prior to a first heating (such as the state of the environmentally resistant patch before and during its application into a void). Furthermore, it should be appreciated that as defined herein, the relative mole percents of the constituents of the cured environmentally resistant patch 50 as presented and claimed herein encompass all compositions that meet these ranges as if said compositions were homogenized. However, it should also be appreciated that not all embodiments of these disclosed and claimed environmentally resistant patches 50 may, in fact, actually be homogenized.

For example, in one particular embodiment, the inorganic composition may comprise about 93 mole percent $RE_2Si_2O_7$, about 4 mole percent $SiO_2$, about 2 mole percent $Fe_3O_4$, and about 1 mole percent $Al_2O_3$. In some embodiments, RE can comprise Y, Yb, or any combination of Y+Yb.

As discussed above, in some embodiments the environmentally resistant patch 50 comprises, prior to curing, on an inorganic solids volume basis, for example, about 69 volume percent coarse sized particles (greater than about 10 um median particle size), about 26 volume percent medium sized particles (between about 1 um and 10 um median particle size) and about 5 volume percent fine particles (smaller than about 1 um median particle size). The uncured composition can comprise, for example, on a mass basis: 0.8 percent fine sized fused silica powder, 28.3 percent medium sized 4 mol % ytterbium-rich (i.e., having a monosilicate minor phase) disilicate powder, 58.2 percent coarse sized yttrium/ytterbium disilicate powder (60 percent by mole yttrium disilicate), 1.0 percent fine iron (II,III) oxide, 0.2 percent fine alumina, 1.8 percent polyethyleneimine (binder), and 9.7 percent water (solvent).

In some embodiments, the inorganic composition of the environmentally resistant patch 50 can include elemental silicon that oxidizes to silica and ultimately becomes incorporated into a rare earth silicate upon reaction with a RE oxide or RE monosolicate. For example, in one particular embodiment, the uncured environmentally resistant patch 50 may comprise by mass about 3.8 percent silicon powder, 11.2 percent ytterbium oxide powder, 17.5 percent 4 mol % ytterbium-rich (i.e., having a monosilicate minor phase) disilicate powder, 55 percent yttrium/ytterbium disilicate powder (60 percent by mole yttrium disilicate), 1.3 percent iron (II,III) oxide, 0.3 percent alumina, and 10.9 percent diethylene glycol butyl ether.

As discussed above, in some embodiments the environmentally resistant patch 50 comprises, prior to curing, on an inorganic solids volume basis, for example, about 65 volume percent coarse sized particles (greater than about 10 um median particle size), about 25 volume percent medium sized particles (between about 1 um and 10 um median particle size) and about 10 volume percent fine particles (smaller than about 1 um median particle size). In embodiments incorporating said silicon, the uncured composition can comprise, for example, by mass percent: 0.7 percent medium sized silicon powder, 3.1 percent fine sized fused silica powder, 11.2 percent medium sized ytterbia powder, 17.5 percent medium sized RE-rich ytterbium disilicate powder (4 mol % ytterbia rich, such that a Yb monosilicate minor phase results), 55.0 percent coarse sized yttrium/ytterbium disilicate powder (60 percent by mole yttrium disilicate), 1.3 percent fine sized iron oxide, 0.3 percent fine sized alumina, and 10.9 percent diethylene glycol butyl ether (solvent).

In some embodiments, the environmentally resistant patch 50 can include a high temperature glass that can wet SiC at high temperatures to further promote patch adhesion. Such glass may have a coefficient of thermal expansion between $3 \times 10^{-6}/^\circ$ C. and about $6 \times 10^{-6}/^\circ$ C. Such glasses may have a chemical composition of the family $RO-Al_2O_3-SiO_2$ where RO is an alkali earth oxide. Such glasses are commercially available, such as, for example, Ferro 0002. For example, the inorganic composition can comprise from about 1 mass percent to about 10 mass percent glass, or about 5 mass percent glass.

The environmentally resistant patch 50 may thereby be formulated to fill the void 5 by tailoring, for example, the adhesive properties, coefficient of thermal expansion ("CTE") range, the viscosity range and/or the particle packing characteristics of the environmentally resistant patch 50 as will become appreciated herein. Furthermore, these compositions of the environmentally resistant patch 50 can thereby approach the chemical and/or thermophysical properties of the surrounding environmental barrier coating 10 and/or CMC substrate material 20 once it is cured, such as through one or more suitable thermal cycles, including turbine operation.

Referring now to FIGS. 3-6, a turbine component patch delivery system 100 is disclosed. The turbine component patch delivery system 100 may be utilized for dispensing any turbine component patch material to a surface 16 of a turbine component 15. Any suitable turbine component patch material may be delivered using the turbine component patch delivery system 100, such as, for example, the environmentally resistant patch 50 discussed and disclosed herein. For the sake of illustration, turbine component patch materials in general, which can include the specific environmentally resistant patches discussed and disclosed herein, are hereinafter collectively referenced as element 50.

The turbine component patch delivery system 100 may facilitate the delivery of the turbine component patch material 50 (including the environmentally resistant patch disclosed herein) to any void 5 or surface 16 of a turbine engine component 15 from a remote distance of an operator. By delivering the turbine component patch material 50 distal the operator, turbine components 15 may be modified with the turbine component patch material 50 while the turbine components 15 are still in a partially or fully assembled turbine. This, in turn, may help repair, rejuvenate, or otherwise modify installed turbine components 15 without the need to fully uninstall the individual turbine components 15.

In some embodiments, the patch delivery system 100 can generally comprise a support arm 110 and a deposition tool 120 supported by the support arm 110.

The support arm 110 can comprise any mechanical support system that allows for the deposition tool 120 to be traversed to a turbine engine component 15 without disassembly of the turbine case (i.e., in situ). For example, in some embodiments, the support arm 110 can comprise a borescope-like mechanical system comprising a series of articulating joints that can maneuver around one or more obstacles to reach a target site. In some embodiments, the support arm 110 may comprise a formable wire. The support arm 110 can additionally or alternatively comprise any other suitable technology such as, for example, cables, mechanized snakes, telescoping poles, or the like, or combinations thereof.

Moreover, the support arm 110 may be configured to be moved in a variety of configurations. In some embodiments, the support arm 110 may simply be moved manually by an operator. In some embodiments, the support arm 110 may be moved via a computer controlled system that relays instructions with or without input from an operator.

As stated above, the turbine component patch delivery system 100 further comprises the deposition tool 120 supported by the support arm 110. The deposition tool 120 generally comprises any tool that can temporarily hold the turbine component patch material 50 and dispense, dispose or otherwise place the turbine component patch material 50 on the surface 16 (e.g., in a void 5) of the turbine component 15.

In some embodiments, the deposition tool 120 can generally comprise a reservoir 121 and a dispenser 122. The reservoir 121 can be configured to house the turbine component patch material 50. In some embodiments, the reservoir 121 may comprise an agitator (not illustrated) configured to mix the turbine component patch material 50 while it is in the reservoir 121. In some embodiments, the turbine component patch delivery system 100 may further comprise a temperature control device (e.g., heat tracing or cooling wires) configured to at least partially control a temperature of the component patch material 50 in the reservoir 121 and/or dispenser such as to prevent premature curing of the material. The dispenser 122 can be configured to dispense the turbine component patch material 50 from the reservoir 121 onto the surface 16 of the turbine component 15, such as through a tip 125.

Figure 4:
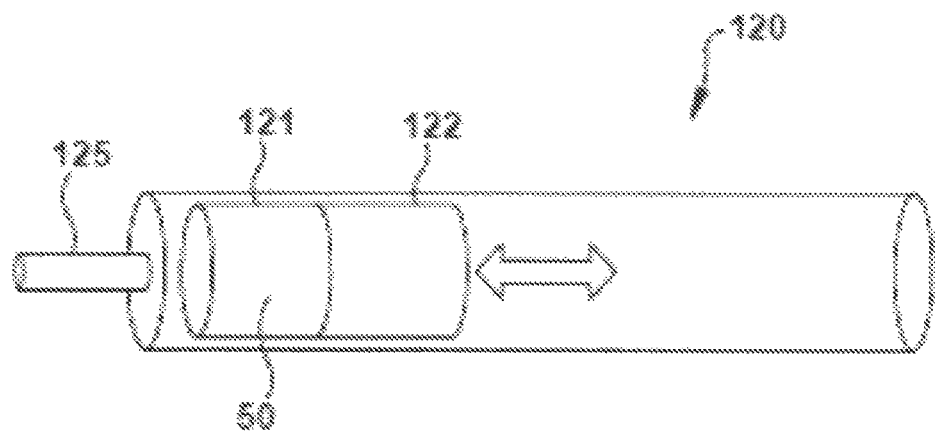
FIG. 4 is a schematic illustration of a deposition tool of the environmentally resistant patch delivery system according to one or more embodiments shown or described herein.
Figure 5:
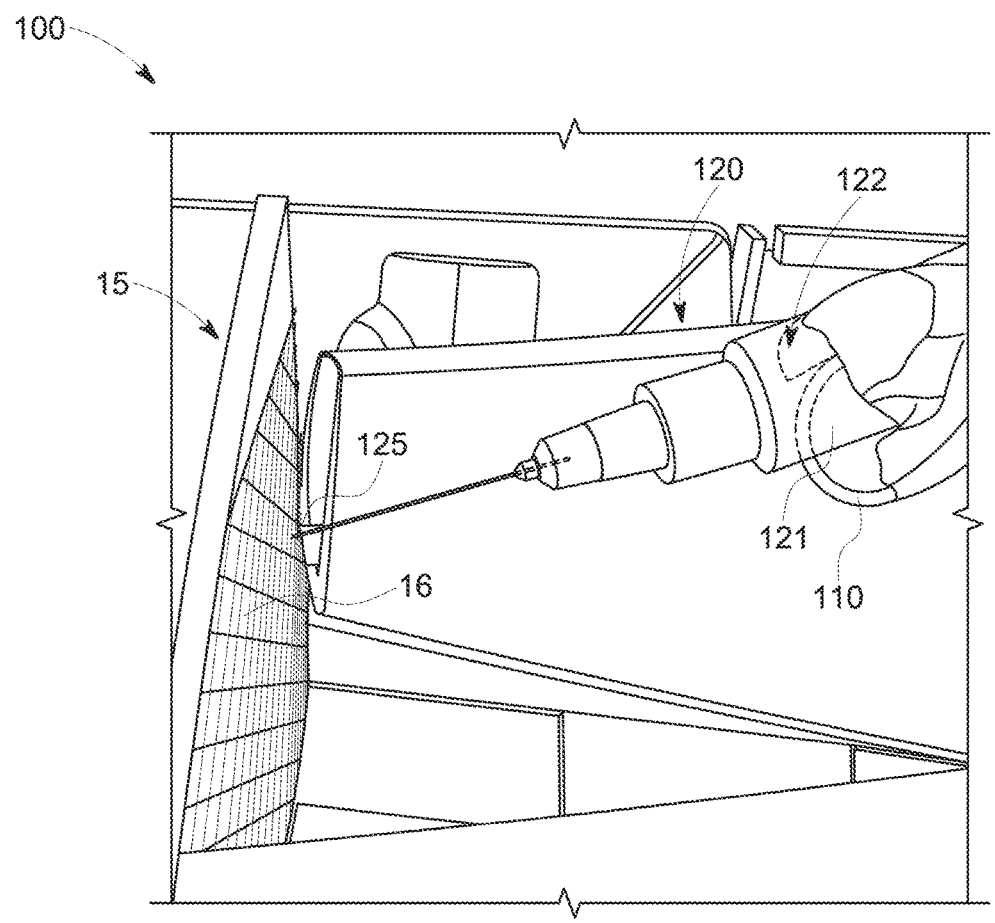
FIG. 5 is another schematic illustration of a deposition tool according to one or more embodiments shown or described herein; and, FIG. 6 is schematic illustration of another turbine component patch delivery system according to one or more embodiments shown or described herein.

The deposition tool 120 can comprise any suitable device or configuration for conveying the turbine component patch materials 50 such as, for example, a mechanical plunger within a syringe as illustrated in FIGS. 4 and 5 (wherein the tube comprises the reservoir 121 and the plunger comprises the dispenser 122). In some embodiments, the dispenser 122 may have a remote actuator configured to remotely control the dispensing of the turbine component patch material 50 (e.g., so that an operator remote from the tip 125 may selectively control when the turbine component patch material 50 is dispensed). In some embodiments, the remote actuator may comprise, for example, pneumatic, hydraulic, mechanical or electro-mechanical connections controlled by the operator of the patch delivery system 100. In some embodiments, the dispenser 122 may itself comprise an articulatable head that may help facilitate more precise deposition of turbine component patch material 50. In other embodiments, the deposition tool 120 may be controlled through a wireless communications system, such as Bluetooth or the like, to direct an electromechanical drive (e.g., screw drive or linear actuator) to dispense the turbine component patch material 50 through the dispenser 122.

In some embodiments, the deposition tool 120 may comprise a more streamlined configuration. For example, the deposition tool 120 may simply comprise a reservoir 121 that that comprises an external storage area (e.g., external surface) such that at least a portion of the turbine component patch material 50 is disposed on the external storage area. In such embodiments, the turbine component patch material 50 disposed on the external storage area of the reservoir 121 may thereby be configured to be directly applied to a surface of the turbine component. For example, the external storage area of the reservoir 121 may comprise a plate or stage that the turbine component patch material 50 is directly disposed on. In some embodiments, the external storage area of the reservoir 121 may comprise a temperature control device as discussed above to help control the temperature of the turbine component patch material 50 disposed thereon. The reservoir 121 may then be brought into close proximity with the turbine component 15 such that the turbine component patch material 50 is brought into contact with the surface 16 of the turbine component 15 and transferred thereon. Such embodiments may allow an operator to simply move the support arm 110 back-and-forth such that the quantity of turbine component patch material 50 disposed on the external storage area is dabbed, scrapped, pressed, spackled or otherwise transferred onto the surface 16 of the turbine component 15 to facilitate modification.

Figure 6:
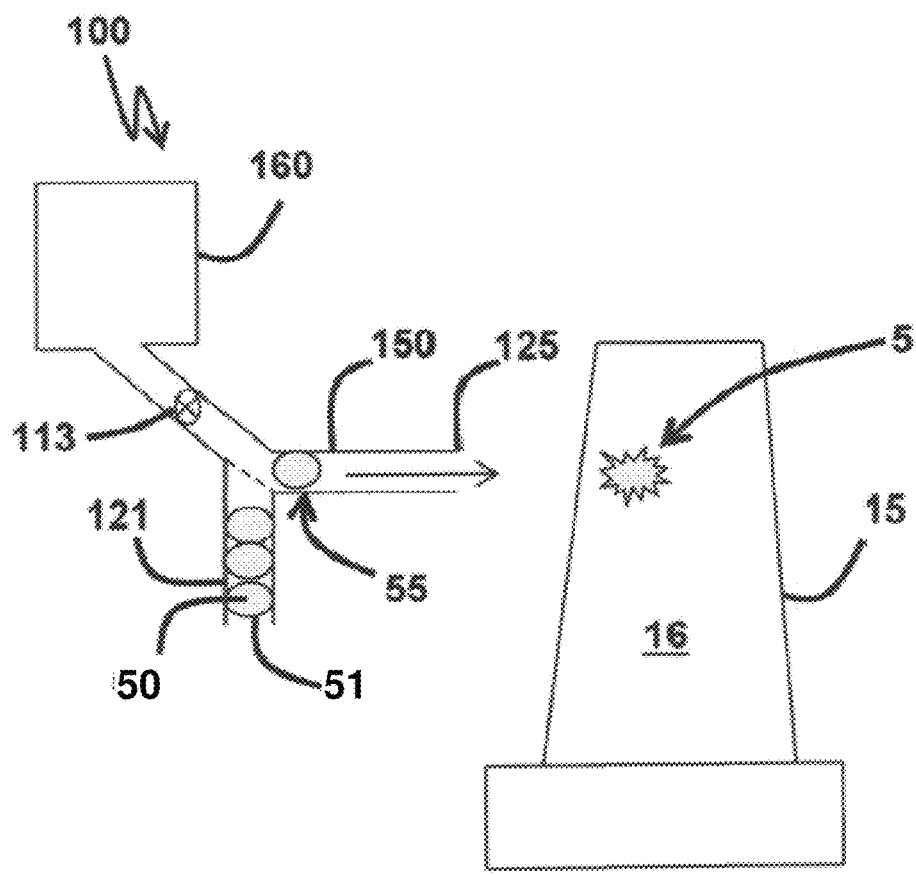

In some embodiments, such as that illustrated in FIG. 6, the deposition tool may comprise a pneumatic dispensing system such as one similar to a paintball delivery system. For example, in such embodiments, the turbine component patch delivery system 100 may comprise a compressed gas source 160 fluidly connected to a delivery line 150. The compressed gas source 160 may be pneumatically isolated from the dispensing end (e.g., the tip 125) of the delivery line 150 using an actuatable valve 113 (e.g., a solenoid). The actuatable valve 113 may be opened during the dispensing operation and maintained closed at other times. Depending in part on the rigidity of the delivery line 150, the delivery line 150 may support itself when being positioned near a turbine component 15 (as illustrated), or may be supported by a support arm 110 similar to other embodiments discussed herein.

The turbine component patch delivery system 100 utilizing the pneumatic dispensing configuration can further comprise one or more turbine component patch carriers 55 that can be projected out of the dispensing end (e.g., the tip 125) of the delivery line 150 via the compressed gas source 160.

The turbine component patch carriers 55 can comprise the turbine component patch material 50 housed within a breakaway shell that breaks open before, during and/or after impact with the surface 16 of the turbine component 15. Similar to a paintball, the breakaway shell may comprise any suitable encapsulation material, such as a water soluble or degradable material. In some embodiments, the breakaway shell may comprise wax, gel, gelatin, denatured collagen, plasticizers and/or thermoplastic polymers such as polystyrene. Moreover, the turbine component patch carriers 55 can comprise any suitable amount of turbine component patch material 50 such that the turbine component patch carriers 55 can travel through the delivery line 150. For example, in some embodiments, each turbine component patch carrier 55 may house from about 1 $mm^3$ to about 200 $mm^3$ of turbine component patch material 50.

The compressed gas source 160 can comprise any suitable compressed gas (or fluid) at any sufficient compression to force the one or more turbine component patch carriers 55 the through delivery line 150 and onto the surface 16 of the turbine component 15 such that the breakaway shell 51 breaks open and deposits the turbine component patch material 50 onto the surface 16. For example, in some embodiments, the compressed gas source 160 may comprise $CO_2$, He, Ar, $N_2$ or air.

In such embodiments, one or more of the turbine component patch carriers 55 may be stored in a reservoir 121 prior to being forced through the delivery line 150 by the compressed gas source 160. In some embodiments, the compressed gas source 160 may project one turbine component patch carrier 55 at a time to facilitate a more controlled and deliberate deposition of the turbine component patch material 50. In some embodiments, the compressed gas source 160 may project a plurality of turbine component patch carriers 55 at the same time to facilitate quicker and broader deposition coverage of the turbine component patch material 50.

The turbine component patch delivery systems 100 utilizing the pneumatic dispensing configurations can thereby facilitate a turbine component patch delivery method. The turbine component patch delivery method can include providing a compressed gas source 160 fluidly connected to a delivery line 150 comprising a dispensing end (e.g., the tip 125) and potentially an actuatable valve 113 and positioning a turbine component patch carrier 55 in the delivery line 150. The turbine component patch carrier 55 can comprise a turbine component patch material 50 housed within a breakaway shell 51 as discussed herein. The turbine component patch delivery method 100 can further comprise projecting the turbine component patch carrier 55 through the delivery line 150 and out the dispensing end (e.g., the tip 125) towards a surface 16 of a turbine component 15 using the compressed gas source 160, wherein the breakaway shell 51 breaks open before, during and/or after impacting the surface 16 of the turbine component 15 to at least partially coat (including fill) the surface 16 of the turbine component 15 with the turbine component patch material 50.

Figure 3:
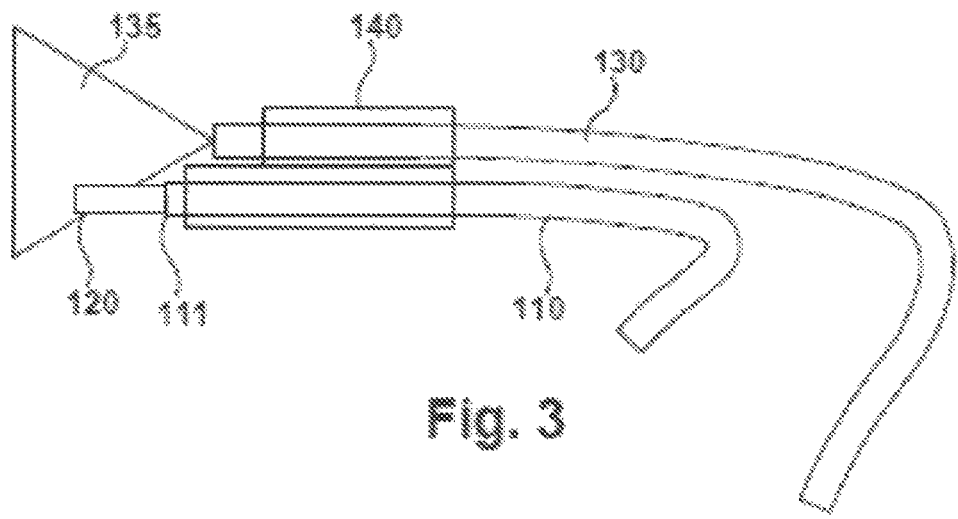
FIG. 3 is a schematic illustration of a turbine component patch delivery system according to one or more embodiments shown or described herein.

With specific reference now to FIG. 3, the turbine component patch delivery system 100 may further comprise one or more auxiliary patch application tools 130 configured to assist in one or more aspects of using the turbine component patch delivery system 100. For example, one or more auxiliary patch application tools 130 may be utilized to further facilitate the locating, dispensing, leveling, curing and/or any other relevant process of modifying the surface 16 of the turbine component 15 with the environmentally resistant patch 50.

For example, in some embodiments, the auxiliary patch application tool 130 may comprise a scraper configured to scrape the surface 16 of the turbine component 15. Such a scraper may be used to scrape the surface before, during or after application of the turbine component patch material 50 to help prepare, apply or finish the modification process. In some embodiments, the auxiliary patch application tool 130 may comprise a fluid flow device configured to direct fluid (e.g., compressed air) in a continuous, pulsating or similar type stream towards the deposited turbine component patch material 50. Such embodiments may help facilitate positioning the turbine component patch material 50 into its desired location and/or help dry the turbine component patch material 50.

In some embodiments, the auxiliary patch application tool 130 may comprise a roller configured to roll the turbine component patch material 50 onto the surface 16 of the turbine component 15. Alternatively or additionally, the auxiliary patch application tool 130 may comprise a brush configured to brush the turbine component patch material 50 on the surface 16 of the turbine component 15.

In some embodiments, the auxiliary patch application tool 130 may comprise an optical system 135 configured to provide an optical field of vision that encompasses at least a portion of the dispenser 122 of the deposition tool 120. Such embodiments can aid the operator in locating any voids 5 or other surface areas 16 on the turbine component 15 and in the subsequent positioning of the dispensing tool 120 in said location for deposition of the turbine component patch material 50. For example, the optical system 135 can comprise a borescope connected to or comprising the support arm 110. In some embodiments, the auxiliary patch application tool 130 may further comprise an in-line laser configured to project a laser in the direction of the turbine component patch material 50 application to help an operator determine where the turbine component patch material 50 will be dispensed.

In some embodiments, the auxiliary patch application tool 130 may comprise a cleaning system (e.g., chemical or mechanical) to prepare the void 5 or surface 16 for modification. In some embodiments, the cleaning system may comprise a pressurized cleaning system configured to project pressurized fluid towards the surface 16 of the turbine component 15 (such as pressurized gas from the compressed gas source 160 when the delivery line 150 embodiment illustrated in FIG. 6 is utilized). The pressurized fluid (e.g., $CO_2$ or another gas) may blow away any debris on the surface 16 of the turbine component 15 to help facilitate a strong bond with the turbine component patch material 15. In some embodiments, the pressurized fluid may comprise a solvent, such as an organic solvent, or a fluidized solid, such as $CO_2$ snow or fluidized grit particles.

In some embodiments, the auxiliary patch application tool 130 may comprise a curing system to help facilitate the curing of the turbine component patch material 50 after it is applied onto the turbine component 15. As used herein, it should be appreciated that drying the turbine component patch material may also be considered curing the turbine component patch material 50. For example, the curing system may comprise a thermal treatment system (e.g., laser or infrared heater), a fan, an ultraviolet light source, a hot air source or any other suitable apparatus to help cure and/or dry the turbine component patch material 50.

In embodiments comprising one or more auxiliary patch application tools 130, the patch delivery system 100 may further comprise a connection system 140 to mechanically connect the auxiliary patch application tool 130 to the support arm 110 (and/or the delivery line 150 and/or tip 125 when present). The connection system 140 may comprise any suitable device, such as brackets, clips, tape or connected tubes that allow for the support arm 110, the auxiliary patch application tool 130, and/or the delivery line 150 to stay in alignment as they are traversed toward the turbine engine component 15.

In operation, the turbine component patch delivery system 100 may thereby facilitate the delivery of turbine component patch material 50 to the surface 16 (e.g., void 5) of a turbine component 15 located at a remote distance. For example, the turbine component patch delivery system 100 may be utilized to deliver turbine component patch material 50 to a turbine component disposed in a partially or fully assembled turbine (e.g., in situ). In such embodiments, the deposition tool 120 or delivery line 150 may be traversed past various components (e.g., first stage nozzles or buckets) to reach a target destination (e.g., second stage nozzles or buckets). An operator may then selectively control the dispensation of the turbine component patch material 50 such that the targeted turbine component 15 is selectively modified with the new material. Such operations may allow for quicker modification processes without the need to partially or fully disassemble the overall turbine.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A turbine component repair patch delivery system comprising:
 a compressed gas source;
 a delivery line fluidly connected to the compressed gas source, wherein the delivery line comprises:
  a deposition tool having a dispensing end, and supported by a flexible support arm;
  an auxiliary patch application tool connected to the flexible support arm, and
 one or more turbine component patch carriers that can be projected out of the dispensing end of the delivery line by the compressed gas source, wherein each of the one or more turbine component patch carriers comprise a turbine component repair patch material housed within a breakaway shell, and
 wherein the auxiliary patch application tool is configured for facilitating locating a desired target location on a turbine component to be modified by the one or more turbine component patch carriers, while the turbine component is in situ within a partially or fully assembled turbine; and
 wherein the turbine component repair patch material possesses a coefficient of thermal expansion that matches with the coefficient of thermal expansion of the desired target location.

2. The turbine component repair patch delivery system of claim 1, wherein each of the one or more turbine component patch carriers houses from 1 mm$^3$ to 200 mm$^3$ of turbine component repair patch material.

3. The turbine component repair patch delivery system of claim 1, wherein the auxiliary patch application tool comprises an optical system configured to provide an optical field of vision configured to include at least a portion of a projected path of the one or more turbine component patch carriers.

4. The turbine component repair patch delivery system of claim 1, wherein the turbine component repair patch material comprises an environmentally resistant repair patch comprising:
one or more rare earth silicates;
wherein an inorganic composition of the environmentally resistant repair patch comprises, once cured, from about 80 mole percent to about 100 mole percent of a rare earth monosilicate and/or rare earth disilicate and from about 0 mole percent to about 20 mole percent of an inorganic additive; and,
wherein the environmentally resistant repair patch has, once cured, an adhesive strength of at least about 3 MPa and a coefficient of thermal expansion of from about $3.5 \times 10^{-6}/°$ C. to about $7.5 \times 10^{-6}/°$ C.

5. The turbine component repair patch delivery system of claim 1, wherein the breakaway shell comprises at least one of a wax, gel, gelatin, denatured collagen, plasticizer or thermoplastic polymer.

6. The turbine component repair patch delivery system of claim 1, wherein the compressed gas source comprises compressed $CO_2$.

7. A turbine component repair patch delivery system comprising:
a compressed gas source;
a delivery line fluidly connected to the compressed gas source, wherein the delivery line comprises:
a deposition tool having a dispensing end, and supported by a flexible support arm;
an auxiliary patch application tool connected to the flexible support arm; and
one or more turbine component patch carriers that can be projected out of the dispensing end of the delivery line by the compressed gas source, wherein each of the one or more turbine component patch carriers comprise a turbine component repair patch material housed within a breakaway shell, and
wherein the auxiliary patch application tool comprises an optical system configured to provide an optical field of vision configured to include at least a portion of a projected path of the one or more turbine component patch carriers and for facilitating locating a desired target location on a turbine component to be modified by the one or more turbine component patch carriers, while the turbine component is in situ within a partially or fully assembled turbine; and
wherein the turbine component repair patch material possesses a coefficient of thermal expansion that matches with the coefficient of thermal expansion of the desired target location.

8. A turbine component repair patch delivery system comprising:
a compressed gas source;
a delivery line fluidly connected to the compressed gas source, wherein the delivery line comprises:
a deposition tool having a dispensing end, and supported by a flexible support arm;
an auxiliary patch application tool connected to the flexible support arm; and
one or more turbine component patch carriers that can be projected out of the dispensing end of the delivery line by the compressed gas source, wherein each of the one or more turbine component patch carriers comprise a turbine component repair patch material housed within a breakaway shell, wherein the turbine component repair patch material comprises an environmentally resistant patch material comprising:
one or more rare earth silicates, wherein an inorganic composition of the environmentally resistant patch comprises, once cured, from about 80 mole percent to about 100 mole percent of a rare earth monosilicate and/or rare earth disilicate and from about 0 mole percent to about 20 mole percent of an inorganic additive, and wherein the environmentally resistant patch has, once cured, an adhesive strength of at least about 3 MPa and a coefficient of thermal expansion of from about $3.5 \times 10^{-6}/°$ C. to about $7.5 \times 10^{-6}/°$ C.; and
wherein the auxiliary patch application tool comprises an optical system configured to provide an optical field of vision configured to include at least a portion of a projected path of the one or more turbine component patch carriers and for facilitating locating a desired target location on a turbine component to be modified by the one or more turbine component patch carriers, while the turbine component is in situ within a partially or fully assembled turbine; and
wherein the turbine component repair patch material possesses a coefficient of thermal expansion that matches with the coefficient of thermal expansion of the desired target location.

\* \* \* \* \*